United States Patent
Yamaguchi et al.

(10) Patent No.: US 7,396,876 B2
(45) Date of Patent: Jul. 8, 2008

(54) TRANSPARENT AND IMPACT-RESISTANT THERMOPLASTIC RESIN COMPOSITIONS

(75) Inventors: Katsumi Yamaguchi, Hyogo (JP); Hitoshi Hayashi, Hyogo (JP); Akio Sato, Hyogo (JP); Mamoru Kadokura, Hyogo (JP)

(73) Assignee: Kaneka Corporation (JP)

( * ) Notice: Subject to any disclaimer, the term of this patent is extended or adjusted under 35 U.S.C. 154(b) by 261 days.

(21) Appl. No.: 11/090,653

(22) Filed: Mar. 25, 2005

(65) Prior Publication Data

US 2005/0234192 A1 Oct. 20, 2005

Related U.S. Application Data

(63) Continuation-in-part of application No. PCT/JP03/12114, filed on Sep. 22, 2003.

(30) Foreign Application Priority Data

Oct. 1, 2002 (JP) ............... 2002-288449

(51) Int. Cl.
*C08L 51/04* (2006.01)
(52) U.S. Cl. .............. 525/71; 525/78; 525/80; 525/83
(58) Field of Classification Search ............ 525/78, 525/71, 80, 83
See application file for complete search history.

(56) References Cited

U.S. PATENT DOCUMENTS

| 4,556,692 A | 12/1985 | Kishida et al. |
| 5,169,903 A | 12/1992 | Toritani et al. |
| 2002/0156183 A1 * | 10/2002 | Nagata et al. ............. 525/70 |

FOREIGN PATENT DOCUMENTS

| CA | 2480637 | * | 10/2003 |
| JP | 56-166217 | | 12/1981 |
| JP | 58-061102 | | 4/1983 |
| JP | 60-118734 | | 6/1985 |
| JP | 61-053350 A | | 3/1986 |
| JP | 61-123648 A | | 6/1986 |
| JP | 61-130365 A | | 6/1986 |
| JP | 61-233040 A | | 10/1986 |
| JP | 63-047745 | | 2/1988 |
| JP | 08-059704 | | 3/1996 |
| JP | 08-157502 | | 6/1996 |
| JP | 10-007873 A | | 1/1998 |
| JP | 10-245468 A | | 9/1998 |
| JP | 2000-001596 A | | 1/2000 |
| JP | 2002-020566 | | 1/2002 |
| JP | 2002-047386 A | | 2/2002 |
| WO | WO 02/04559 | * | 1/2002 |

OTHER PUBLICATIONS

Supplementary European Search Report from Application No. EP 03 79 9122, Mar. 29, 2006, 3 pages.

* cited by examiner

*Primary Examiner*—Jeffrey C Mullis
(74) *Attorney, Agent, or Firm*—Brinks Hofer Gilson & Lione

(57) ABSTRACT

A thermoplastic resin component has improved transparency and impact resistance, the thermoplastic resin composed of 5 to 40 parts by weight of a graft copolymer (A) and 95 to 60 parts by weight a copolymer (B), the graft copolymer (A) being prepared by polymerizing at least one selected from the group consisting of alkyl methacrylate, aromatic vinyl, and vinylcyanide with an agglomerated rubber, the copolymer (B) being prepared by polymerizing at least one monomer selected from the group consisting of an aromatic vinyl monomer, an alkyl methacrylate monomer, and a vinylcyanide monomer. The agglomerated rubber is prepared by agglomerating a styrene-diene rubber latex with an acid-group-containing copolymer latex containing unsaturated acid, aromatic vinyl, and alkyl acrylate as the essential components and having a controlled refractive index.

4 Claims, No Drawings

TRANSPARENT AND IMPACT-RESISTANT THERMOPLASTIC RESIN COMPOSITIONS

RELATED APPLICATIONS

This application is a continuation-in-part of International Application No. PCT/JP2003/012114, filed Sep. 22, 2003, which claims the benefit of Japanese Patent Application No. 2002-288449, filed Oct. 1, 2002, the entire contents of both of which are incorporated herein by reference, except that in the event of any inconsistent disclosure or definition from the present application, the disclosure or definition herein shall be deemed to prevail.

TECHNICAL FIELD

The present invention relates generally to transparent, impact-resistant, thermoplastic resin compositions. More particularly, the present invention relates to resins containing a material selected from the group consisting of aromatic vinyls, alkyl methacrylates, vinyl cyanides, and combinations thereof (hereinafter referred to as the "aromatic vinyl, alkyl methacrylate, or vinyl cyanide resin composition"), and, inter alia, an aromatic vinyl resin composition or an aromatic vinyl-acryl copolymer resin composition.

BACKGROUND

Aromatic vinyl, alkyl methacrylate or vinylcyanide resins are used in various applications owing to their transparency. However, they typically do not have sufficient strength to meet market demand. In order to overcome this problem, various attempts have been made to introduce rubber components into the resins. For example, there is a method in which a graft copolymer having a core-shell structure prepared by emulsion polymerization is added into the resins as the rubber component. According to this method, rubber properties or morphology (e.g., rubber content or particle size) can be controlled relatively easily, such that there is a relatively large capability for designing the balance of impact resistance and transparency. However, in providing sufficient impact resistance to a resin having a high aromatic vinyl monomer content, the required particle diameter of the rubber component is relatively large with respect to the size range generally achieved by emulsion polymerization.

Accordingly, various methods for growing rubber particles have been investigated. For example, there is a method for adding a core-shell graft copolymer to a methyl methacrylate-styrene copolymer resin, whereby the core-shell graft copolymer is prepared by graft-polymerizing a monomer with rubber particles grown by agglomerating a small-particle resin component to have a particle diameter of 0.5 μm using an electrolyte such as acid or salt (e.g., see Japanese Examined Patent Application Publication No. 63-47745). This agglomeration method, which uses a water-soluble electrolyte, suffers from increased amounts of scale produced during polymerization due to the instability of the latex caused by addition of the electrolyte. Moreover, the method has a low upper limit of the particle size of the agglomerated rubber particles. Thus, making a large-particle graft copolymer according to this method is difficult.

In other methods, a graft copolymer is added to an aromatic vinyl-acryl copolymer resin, wherein the graft copolymer is prepared by graft-polymerizing a monomer with rubber particles grown using an acid-group-group-containing copolymer having a predetermined composition (e.g., Japanese Unexamined Patent Application Publication Nos. 60-118734 and 2002-20566). According to these methods, agglomerated rubber particles can be easily produced relative to those obtained by emulsion polymerization methods, and good impact resistance can be achieved. However, the transparency is not high enough to allow the resin to be applied for uses requiring high transparency. As noted above, conventional core-shell graft copolymer resin particles have failed to achieve high impact resistance without impairing the good transparency of the aromatic vinyl, alkyl methacrylate, or vinylcyanide resins.

Thus, the performance of core-shell graft copolymer resin particles needs to be improved.

SUMMARY

The scope of the present invention is defined solely by the appended claims, and is not affected to any degree by the statements within this summary.

By way of introduction, an impact-resistant thermoplastic resin composition embodying features of the present invention includes 5 to 40 parts by weight of a graft copolymer (A) and 95 to 60 parts by weight of a copolymer (B). The copolymer (B) is prepared by polymerizing 75 to 100 percent by weight of a monomer selected from the group consisting of an aromatic vinyl monomer, an alkyl methacrylate monomer, a vinylcyanide monomer, and combinations thereof, with 25 to 0 percent by weight of a vinyl monomer copolymerizable therewith, such that (A) and (B) total 100 parts by weight. The graft copolymer (A) is prepared by polymerizing 60 to 15 parts by weight of a monomer mixture (GM) in the presence of 40 to 85 parts by weight of agglomerated rubber particles (R2) having a volume average particle diameter of 1,900 to 20,000 Å, such that the agglomerated rubber particles (R2) and the monomer mixture (GM) total 100 parts by weight.

DETAILED DESCRIPTION

The present invention provides a thermoplastic resin composition that can achieve high impact resistance without impairing the transparency characteristic of aromatic vinyl, alkyl methacrylate, or vinylcyanide resins.

In the preparation of rubber toughened transparent polymer compounds, it has generally been understood that the difference in refractive index between a matrix resin and a grafted rubber copolymer blended to the matrix has an adverse effect on the transparency. In order not to impair the transparency, the difference in refractive index between the two is reduced as much as possible. However, in the preparation of the grafted rubber copolymer from a agglomerated rubber using a small amount of an acid-group-containing copolymer, the adverse effect on the transparency due to the difference in the refractive index of the acid-group containing copolymer has generally not been considered.

It has been discovered by the present inventors that it is effective to add into an aromatic vinyl, alkyl methacrylate, or vinylcyanide resin a graft copolymer made using an agglomerated rubber prepared using an acid-group-group-containing copolymer having a particular composition and a refractive index.

In some embodiments, the present invention provides one or more of the following:

an impact-resistant thermoplastic resin composition comprising 5 to 40 parts by weight of a graft copolymer (A) and 95 to 60 parts by weight a copolymer (B), the copolymer (B) being prepared by polymerizing 75 to 100 percent by weight of a monomer selected from the group consisting of an aromatic vinyl monomer, an alkyl methacrylate monomer, a vinylcyanide monomer, and combinations thereof with 25 to 0 percent by weight of a vinyl monomer copolymerizable with these monomers, such that the total of the graft copolymer (A) and the copolymer (B) is 100 parts by weight.

In some embodiments, the graft copolymer (A) is prepared by polymerizing 60 to 15 parts by weight of a monomer mixture (GM) in the presence of 40 to 85 parts by weight of large rubber particles, enlarged by agglomeration (R2), having a volume average particle diameter of 1,900 to 20,000 Å, such that the total of the agglomerated rubber particles (R2) and the monomer mixture (GM) is 100 parts by weight.

In some embodiments, the monomer mixture (GM) comprises 80 to 100 percent by weight of a monomer selected from the group consisting of an alkyl methacrylate monomer, an aromatic vinyl monomer, a vinylcyanide monomer, and combinations thereof, and 20 to 0 percent by weight of a vinyl monomer copolymerizable with these monomers.

In some embodiments, the agglomerated rubber particles (R2) are prepared through agglomeration by adding 0.1 to 15 parts by weight (solid content) of an acid-group-group-containing copolymer (S) latex into 100 parts by weight of a diene rubber (R1) having a volume average particle diameter of 1,500 Å or less.

In some embodiments, the acid-group-group-containing copolymer (S) latex is made by polymerizing a monomer mixture comprising 5 to 25 percent by weight of an unsaturated acid monomer selected from the group consisting of acrylic acid, methacrylic acid, itaconic acid, crotonic acid, and combinations thereof, 70 to 10 percent by weight of an aromatic vinyl monomer, 5 to 30 percent by weight of one or a plurality of alkyl acrylate monomers having $C_1$ to $C_{12}$ alkyl, 0 to 20 percent by weight of another alkyl methacrylate monomer having $C_1$ to $C_{12}$ alkyl, and 0 to 20 percent by weight of a vinyl monomer copolymerizable with these monomers.

In some embodiments, the diene rubber (R1) is made by polymerizing a monomer mixture comprising 40 to 100 percent by weight of a conjugated diene monomer, 60 to 0 percent by weight of an aromatic vinyl monomer, 20 to 0% of another vinyl monomer copolymerizable with the conjugated diene monomer, 0 to 3 percent by weight of a cross-linkable monomer, and 0 to 3 percent by weight of a chain transfer agent.

In some embodiments, the acid-group-group-containing copolymer (S) is made by polymerizing the monomer mixture containing 10 to 20 percent by weight of an unsaturated acid monomer selected from the group consisting of acrylic acid, methacrylic acid, itaconic acid, crotonic acid, and combinations thereof, 20 to 65 percent by weight of the aromatic vinyl monomer, 15 to 30 percent by weight of at least one alkyl acrylate monomer having $C_1$ to $C_{12}$ alkyl, 0 to 20 percent by weight of the alkyl methacrylate monomer having $C_1$ to $C_{12}$ alkyl, and 0 to 20 percent by weight of the vinyl monomer copolymerizable with these monomers.

In some embodiments, the diene rubber (R1) having a volume-average particle diameter of 1,500 Å or less is made by polymerizing 60 to 95 percent by weight of the conjugated diene monomer, 40 to 5 percent by weight of the aromatic vinyl monomer, 10 to 0 percent by weight of the vinyl monomer copolymerizable with the conjugated diene monomer, 0 to 3 percent by weight of the cross-linkable monomer, and 0 to 3 percent by weight of the chain transfer agent.

In some embodiments, the difference in refractive index between the graft copolymer (A) and the copolymer (B) is 0.02 or less.

In some embodiments, the difference in refractive index between the acid-group-group-containing copolymer (S) and the graft copolymer (A) is 0.02 or less.

In some embodiments, the acid-group-group-containing polymer latex (S) has a multilayer structure made by (i) polymerizing a monomer mixture (s1) either having (a) a low unsaturated acid content compared to when the acid-group-group-containing polymer latex (S) has a homogenous composition or (b) no unsaturated acid, and then (ii) sequentially polymerizing a monomer mixture (s2) having a high unsaturated acid content compared to when the acid-group-group-containing polymer latex (S) has a homogenous composition so as to form an outer layer.

In some embodiments, the copolymer (B) is a mixture containing at least two polymers or copolymers, the mixture as a whole containing 20 to 90 percent by weight of the aromatic vinyl monomer, 10 to 80 percent by weight of a monomer selected from the group consisting of a vinylcyanide monomer, an alkyl methacrylate monomer, and a combination thereof, and 0 to 25 percent by weight of the vinyl monomer copolymerizable with these monomers.

In some embodiments, the diene rubber (R1) in the graft copolymer (A) is prepared by polymerizing 40 to 100 percent by weight of a conjugated diene monomer, 40 to 0 percent by weight of an aromatic vinyl monomer, 20 to 0 percent by weight of another vinyl monomer copolymerizable with the conjugated diene monomer, 0 to 3 percent by weight of a cross-linkable monomer, and 0 to 3 percent by weight of a chain transfer agent.

Examples of the conjugated diene monomer used in the diene rubber (R1) include but are not limited to butadiene and various substituted butadienes, such as isoprene and chloroprene. The amount of the diene monomer used is 40 to 100 percent by weight, preferably 60 to 95 percent by weight, and more preferably 65 to 90 percent by weight. At a diene monomer content of less than 40 percent by weight, the impact strength of the resulting molded product may be insufficient.

Examples of the aromatic vinyl monomer used in the diene rubber (R1) include but are not limited to styrene, vinyltoluene, α-methyl styrene, and vinylnaphthalene that may be aromatic-ring-substituted with chlorine, bromine, an alkyl group, or the like. The amount of the aromatic vinyl monomer used is 60 to 0 percent by weight, preferably 40 to 0 percent by weight, more preferably 40 to 5 percent by weight, and most preferably 35 to 10 percent by weight. At an aromatic vinyl monomer content exceeding 40 percent by weight, the impact strength of the resulting molded product may be insufficient.

Nonlimiting examples of the vinyl monomer copolymerizable with the conjugated diene monomer used in the diene rubber (R1) include but are not limited to methacrylate compounds, such as methyl methacrylate, ethyl methacrylate, propyl methacrylate, and butyl methacrylate; acrylate compounds such as methyl acrylate, ethyl acrylate, propyl acrylate, and butyl acrylate; and vinylcyanides such as acrylonitrile and methacrylonitrile. These may be used alone or in combination.

For applications in accordance with the present invention that require relatively higher transparency, it is preferable to adjust the refractive index of the graft copolymer (A) made by polymerizing the monomer mixture (GM) in the presence of the diene rubber (R1) as close to the refractive index of the matrix resin (i.e., the aromatic vinyl, alkyl methacrylate, or vinylcyanide resin (B)) as possible. In particular, when an aromatic vinyl, alkyl methacrylate, or vinylcyanide resin has a relatively high refractive index, the diene rubber (R1) practically contains aromatic vinyl monomer units from the standpoint of the refractive index adjustment.

In accordance with the present invention, the refractive index is determined as follows. Five parts by weight (relative to solid content) of calcium chloride is added to a moiety of the obtained latex, and the resulting mixture is precipitated, heated to 70° C., and dehydrated to prepare a dry powder. The refractive index of the dry powder is determined at 23° C. with a refractometer (Abbe 2T, manufactured by Atago Co., Ltd.). Polymerization is preferably conducted by adjusting the rubber (R1) composition, the acid-group-group-containing copolymer (S) composition, and the graft (GM) composition based on the prescribed setting (e.g., based on the calculation from refractive indices described in documents such as POLYMER HANDBOOK, 4th Edition, John Wiley & Sons Inc., 1999).

The diene rubber (R1) in accordance with the present invention is preferably prepared by known emulsion polymerization, and the volume-average particle diameter of the diene rubber (R1) is preferably 1,500 Å or less. A volume-average particle diameter exceeding 1,500 Å results in longer polymerization time, thereby degrading industrial productivity.

Examples of the cross-linkable monomer in the diene rubber (R1) include but are not limited to compounds having at least two polymerizable functional groups in a molecule (e.g., commonly available cross-linkable monomers, such as allyl (meth)acrylate, divinylbenzene, diallyl phthalate, and ethylene glycol di(meth)acrylate). The cross-linkable monomer is used as necessary. The amount of the cross-linkable monomer is preferably in the range of 0 to 3 percent by weight, and more preferably 0 to 1.5 percent by weight. At an amount of the cross-linkable monomer exceeding 3 percent by weight, the impact strength of the resulting molded product may be insufficient.

Examples of the chain transfer agent in the diene rubber (R1) include but are not limited to known chain transfer agents such as n-dodecyl mercaptan and t-dodecyl mercaptan. The chain transfer agent is used as necessary. The amount of the chain transfer agent is preferably in the range of 0 to 3 percent by weight, and more preferably 0 to 1.5 percent by weight. At an amount exceeding 3 percent by weight, the impact strength of the resulting molded product may be insufficient.

In accordance with the present invention, the diene rubber (R1) obtained as described above is agglomerated using an acid-group-group-containing copolymer (S) latex having a predetermined composition and, in particular, a predetermined refractive index to make the agglomerated diene rubber (R2) having large particles.

The general rubber latex agglomeration method and typical compositions of acid-group-group-containing copolymers that serve the above-described purpose are described, for example, in Japanese Unexamined Patent Application Publication Nos. 56-166217, 58-61102, 8-59704, 8-157502, 60-118734, and 2002-20566.

In contrast to conventional procedures, the acid-group-group-containing copolymer (S) latex used in the graft copolymer (A) of the present invention is made by polymerizing the monomer mixture (the total being 100 percent by weight) containing 5 to 25 percent by weight of an unsaturated acid selected from the group consisting of acrylic acid, methacrylic acid, itaconic acid, crotonic acid, and combinations thereof, 70 to 10 percent by weight of an aromatic vinyl monomer, 5 to 30 percent by weight of one or a plurality of alkyl acrylate monomers having $C_1$ to $C_{12}$ alkyl, 0 to 20 percent by weight of alkyl methacrylate monomer having $C_1$ to $C_{12}$ alkyl, and 0 to 20 percent by weight of a vinyl monomer copolymerizable with these.

From the practical standpoint, the unsaturated acid used in the acid-group-group-containing copolymer (S) is preferably acrylic acid, methacrylic acid, or a mixture thereof. The amount of the unsaturated acid used is 5 to 25 percent by weight, and preferably 10 to 20 percent by weight. At an amount of the unsaturated acid less than 5 percent by weight, agglomeration capacity may be insufficient. At an amount of the unsaturated acid exceeding 25 percent by weight, coagulation of the rubber latex may occur or the latex may become highly viscous, making the material unsuitable for industrial production.

Examples of the aromatic vinyl monomer in the acid-group-group-containing copolymer (S) include but are not limited to styrene, vinyltoluene, α-methyl styrene, and vinylnaphthalene that may be aromatic-ring-substituted by a chlorine group, a bromine group, an alkyl group, a mercapto group, an amino group, a sulfonate group, a hydroxy group, or the like. The amount of the aromatic vinyl monomer is preferably 10 to 70 percent by weight, more preferably 20 to 65 percent by weight, and most preferably 30 to 60 percent by weight. When the amount of the aromatic vinyl monomer is less than 10 percent by weight, the refractive index of the resulting acid-group-group-containing copolymer (S) decreases. As a consequence, the transparency of the agglomerated rubber (R2) and the graft copolymer (A) containing such an acid-group-group-containing copolymer (S) may be adversely affected, and the practical applicability may be impaired. At an amount of the aromatic vinyl monomer exceeding 70 percent by weight, the agglomeration capacity of the resulting acid-group-group-containing copolymer (S) may be degraded.

In some embodiments, the alkyl acrylate in the acid-group-group-containing copolymer (S) is an acrylic ester having a $C_1$ to $C_{12}$ alkyl group. Specific examples thereof include but are not limited to methyl acrylate, ethyl acrylate, propyl acrylate, butyl acrylate, and 2-ethylhexyl acrylate. In particular, those with a $C_1$ to $C_8$ alkyl group are presently preferred. These acrylates may be used alone or in combination. Acrylates containing alkyl groups having more than twelve carbon atoms tend to decrease the polymerization rate and tend to require a long time for the polymerization. The amount of alkyl acrylate used is 5 to 30 percent by weight, and preferably 15 to 30 percent by weight. At an amount of alkyl acrylate less than 5 percent by weight, the agglomeration capacity may be degraded. At an amount of alkyl acrylate exceeding 30 percent by weight, the amount of coagulated scale may increase during the production of the acid-group-group-containing copolymer (S) latex (also, the refractive index of the resulting acid-group-group-containing copolymer (S) decreases, and the transparency of the agglomerated rubber (R2) and the graft copolymer (A) made using the acid-group-containing copolymer (s) may be degraded.)

In some embodiments, the alkyl methacrylate in the acid-group-group-containing copolymer (S) is alkyl methacrylate having $C_1$ to $C_{12}$ alkyl group. Specific examples thereof include but are not limited to methyl methacrylate, ethyl methacrylate, propyl methacrylate, and butyl methacrylate. In particular, those with a $C_1$ to $C_8$ alkyl group are presently preferred. These methacrylates may be used alone or in combination. Methacrylates containing alkyl groups having more than twelve carbon atoms tend to decrease the polymerization rate and tend to require a long time for the polymerization. The amount of alkyl methacrylate used is 0 to 20 percent by weight, and preferably 0 to 15 percent by weight. At an amount outside this range, the refractive index of the resulting acid-group-group-containing copolymer (S) decreases, and the transparency of the agglomerated rubber (R2) and the graft copolymer (A) made using the acid-group-containing copolymer (s) may be degraded.

Examples of the copolymerizable vinyl monomer in the acid-group-group-containing copolymer (S) include but are not limited to vinylcyanide monomers, such as acrylonitrile and methacrylonitrile, and cross-linkable monomers, such as allyl methacrylate and polyethylene glycol dimethacrylate, having at least two polymerizable functional groups in the molecule. These monomers may be used alone or in combination. The amount of the copolymerizable vinyl monomer used is 0 to 20 percent by weight, and preferably 0 to 10 percent by weight. At an amount of the copolymerizable polymer exceeding 20 percent by weight, agglomeration capacity and the transparency may be degraded. Moreover, 0 to 3 percent by weight of a chain transfer agent, such as n-dodecyl mercaptan or t-dodecyl mercaptan, may be used if necessary.

In order to increase the agglomeration capacity, the acid-group-group-containing copolymer (S) latex may have a non-homogeneous structure instead of a homogenous structure. In other words, the acid-group-group-containing copolymer (S) is preferably a multilayer structure copolymer prepared by polymerizing in a first stage a monomer mixture (s1) either having a lower unsaturated acid content compared to the average unsaturated acid content of the total acid-group-containing copolymer formulation, or containing no unsaturated acid, and then, in a second stage, sequentially polymerizing a monomer mixture (s2) having a higher unsaturated acid content compared to the average unsaturated acid content of the total acid-group-containing copolymer formulation so as to form an outer layer.

The volume-average particle diameter of the acid-group-group-containing copolymer (S) is not limited but is preferably in the range of 600 to 3,000 Å and more preferably 800 to 2,000 Å. At a volume-average particle diameter of the acid-group-group-containing copolymer (S) latex less than 600 Å, the agglomeration capacity may be insufficient. At a volume-average particle diameter exceeding 3,000 Å, since the polymerization stability is decreased and the polymerization scales are readily generated, the practicality of the process on an industrial scale diminishes.

The agglomerated rubber particles (R2) in the graft copolymer (A) are made through agglomeration by adding the acid-group-group-containing copolymer (a2) to the diene rubber (R1). The amount of the acid-group-group-containing copolymer (S) latex used is preferably 0.1 to 15 parts by weight (solid content), and more preferably 0.5 to 6 parts by weight relative to 100 parts by weight of the diene rubber (R1). At an amount of the acid-group-group-containing copolymer (S) latex of less than 0.1 part by weight, the amount of the unagglomerated diene rubber (R1) increases, and the target average particle diameter may not be achieved by agglomeration. At an amount exceeding 15 parts by weight, controlling the particle diameter becomes difficult, and the properties of the resulting molded product may be degraded. Preferably, the amount of the latex is 0.5 to 6 parts by weight since the amount of the unagglomerated diene rubber may be decreased and the volume-average particle diameter of the agglomerated rubber particles (R2) may be made relatively uniform and stable.

The volume-average particle diameter of the agglomerated rubber particles (R2) in accordance with the present invention is preferably 1,900 to 20,000 Å, more preferably 1,900 to 10,000 Å, and most preferably 2,500 to 8,000 Å to provide sufficient impact strength to the resulting end product. At a volume-average particle diameter less than 1,900 Å, it would become difficult to provide sufficient impact strength. At a volume-average particle diameter exceeding 20,000 Å, the polymerization may become less stable, the industrial production becomes difficult, and the transparency of the molded product may be degraded.

In some embodiments, the graft copolymer (A) in accordance with the present invention is prepared by polymerizing a monomer mixture (GM) described below in the presence of the agglomerated rubber particles (R2). In particular, the graft copolymer (A) is prepared by polymerizing 60 to 15 parts by weight of the monomer mixture (GM) in the presence of 40 to 85 parts by weight of the agglomerated rubber particles (R2) having a volume average particle diameter of 1,900 to 20,000 Å. The total of the agglomerated rubber particles (R2) and the monomer mixture (GM) is 100 parts by weight. Here, the monomer mixture (GM) contains 80 to 100 percent by weight of at least one monomer selected from the group consisting of an alkyl methacrylate monomer, an aromatic vinyl monomer, and a vinylcyanide monomer, and 0 to 20 percent by weight of a vinyl monomer polymerizable with these monomers.

Examples of the aromatic vinyl monomer in the monomer mixture (GM) include but are not limited to styrene, vinyltoluene, and α-methyl styrene. Examples of the methacrylate monomer include but are not limited to methyl methacrylate, ethyl methacrylate, propyl methacrylate, and butyl methacrylate. Examples of the vinylcyanide monomer include but are not limited to acrylonitrile and methacrylonitrile. Examples of the vinyl monomer copolymerizable with these include but are not limited to acrylate monomers, such as methyl acrylate, ethyl acrylate, propyl acrylate, butyl acrylate, and 2-ethylhexyl acrylate. These may be used alone or in combination.

The difference between the refractive index of the resulting graft copolymer (A) and the refractive index of the aromatic vinyl, alkyl methacrylate, or vinylcyanide resin composition (B) is preferably 0.02 or less, more preferably 0.01 or less, and most preferably 0.005 or less. With a difference in refractive index between graft copolymer (A) and the resin composition (B) exceeding 0.2, the resulting product tends to exhibit poor transparency.

The difference in refractive index between the resulting graft copolymer (A) and the acid-group-group-containing copolymer (S) used is preferably 0.02 or less, more preferably 0.01 or less, and most preferably 0.005 or less. With a difference in refractive index between (A) and (S) exceeding 0.02, the transparency may be degraded. Conventionally, the adverse effect of the difference in refractive index between the acid-group-group-containing copolymer (S) and the resulting agglomerated rubber (R2) or graft copolymer (A) on the transparency has not been considered because the amount of the acid-group-group-containing copolymer used in making agglomerated rubber has been small and therefore the influence of the reflective index of the acid-group-containing copolymer on the transparency was not considered to be serious. Accordingly, the transparency of conventional products has not been sufficient. In contrast, the present inventors have recognized the importance of the difference in the refractive index between the acid-group-group-containing copolymer (S) and the agglomerated rubber (R2) or the graft copolymer (A), and modified the composition of the monomer mixture of the acid-group-group-containing copolymer (S), thereby dramatically improving the transparency of the resulting products.

The thermoplastic resin used for the matrix resin of the resin composition of the present invention is the copolymer (B). In some embodiments, the copolymer (B) is made by polymerizing 75 to 100 percent by weight of a monomer selected from the group consisting of an aromatic vinyl monomer, an alkyl methacrylate monomer, a vinylcyanide monomer, and combinations thereof with 25 to 0 percent by weight of a vinyl monomer polymerizable with these monomers.

Specific examples of the aromatic vinyl monomer used in the copolymer (B) include but are not limited to styrene, vinyltoluene, and α-methyl styrene. The amount of the aromatic vinyl monomer used is preferably 20 to 90 percent by weight, and more preferably 30 to 80 percent by weight. At an amount of the aromatic vinyl monomer exceeding 90 percent by weight, the transparency and the impact strength of the resulting product may be degraded. At an amount less than 20 percent by weight, the transparency of the resulting product may be degraded.

Examples of the alkyl methacrylate monomer in the copolymer (B) include but are not limited to methyl methacrylate, ethyl methacrylate, propyl methacrylate, and butyl methacrylate. Examples of the vinylcyanide monomer include but are not limited to acrylonitrile and methacrylonitrile. These may be used alone or in combination. The amount of the at least one monomer selected from the group consisting of alkyl methacrylate, vinylcyanide, and a combination thereof is preferably 10 to 80 percent by weight, and more preferably 20 to 70 percent by weight.

Examples of the polymerizable vinyl monomer in the copolymer (B) in accordance with the present invention include but are not limited to acrylate monomers, such as methyl acrylate, ethyl acrylate, propyl acrylate, butyl acrylate, and 2-ethylhexyl acrylate. The amount of the vinyl monomer is preferably 0 to 25 percent by weight, and more preferably 0 to 15 percent by weight.

The copolymer (B) in accordance with the present invention may include a plurality of polymers or copolymers as long as the above-described composition ranges are satisfied. For example, the copolymer (B) may be a mixture of an aromatic vinyl-vinylcyanide copolymer and an alkyl methacrylate polymer. In such a case, the compatibility between the two polymers or copolymers should be high enough so as not to result in adverse effects on the characteristics of the transparent resin.

The copolymer (B) may contain a small amount of rubber component, if necessary. For example, a monomer used as the rubber component may be a monomer selected from the group consisting of an alkyl acrylate monomer, a diene monomer, an olefin monomer, and combinations thereof. Representative examples of the diene monomer include but are not limited to butadiene and various substituted butadienes, such as isoprene and chloroprene. Representative examples of the olefin monomer include but are not limited to ethylene, propylene, 1-butene, and isobutylene. These may be used alone or in combination, as necessary. In order to control the refractive index within the proper range, a nonrubber monomer mixture, such as an aromatic vinyl monomer, an alkyl (meth) acrylate monomer, or a vinylcyanide monomer, may be used in polymerization, if necessary.

When the copolymer (B) contains the above-described rubber component, the rubber content relative to 100 percent by weight of the entire copolymer (B) is 30 percent by weight or less, preferably 25 percent by weight or less, and more preferably 20 percent by weight or less. At a rubber content exceeding 30 percent by weight, the rigidity, heat resistance, and transparency of the resulting product may be degraded.

Addition of the rubber component to the thermoplastic copolymer (B) may be achieved using methods known in the art. Examples thereof include but are not limited to: a rubber-containing thermoplastic copolymer production method whereby a monomer mixture (B) (i.e., a nonrubber component) is polymerized in the presence of a polymer composed of a rubber monomer; a bulk polymerization or solution polymerization method whereby a liquid rubber or a noncrosslinked solid rubber is dissolved in a monomer mixture (i.e., a matrix resin); and a blending method whereby a rubbery polymer or a block, random, or graft copolymer containing the rubbery polymer is blended with a thermoplastic copolymer (B) composed of a nonrubber monomer.

The impact-resistant thermoplastic resin composition embodying features of the present invention is prepared by melt-blending of 5 to 40 parts by weight of the graft copolymer (A) and 95 to 60 parts by weight of the copolymer (B). The total of (A) and (B) is 100 parts by weight. At an amount of the graft copolymer (A) less than 5 parts by weight, the impact strength of the resulting product may be insufficient. At an amount exceeding 40 parts by weight, the rigidity, modulus, heat resistance, and the like may be decreased. In the preparation of compounds embodying features of the present invention, known additives such as a stabilizer, a lubricant, a pigment, a plasticizer, an antistatic agent, an anticlouding agent, a mold releasing agent, and a filler may be used alone or in combination to an extent that does not spoil the properties of the aromatic vinyl, alkyl methacrylate, or vinylcyanide resin. The resulting thermoplastic resin composition may be molded by known methods, such as extrusion, injection or other types of molding to form a molded product.

The compositions embodying features of the present invention will now be described by way of examples. The following representative procedures and examples are provided solely by way of illustration, and are not intended to limit the scope of the appended claims or their equivalents.

EXAMPLES

The measurements and evaluation of EXAMPLES and COMPARATIVE EXAMPLES were conducted according to the following conditions and methods.

(a) Determination of Average Grain Diameter

The obtained latex was diluted with water, and the average particle diameter was determined with a microtrac particle size analyzer (Model 9230UPA, manufactured by Nikkiso Co., Ltd.).

(b) Determination of Refractive Index

To a moiety of the obtained latex, 5 parts by weight (relative to the solid content) of calcium chloride was added. The mixture was precipitated, heated to 70° C., and dehydrated to prepare a dry powder. The refractive index was measured at 23° C. with a refractometer (Abbe 2T, manufactured by Atago Co., Ltd.).

(c) Evaluation of Impact Resistance

The pellets prepared according to the conditions set forth in EXAMPLE 1 were injection-molded with an injection molding machine (160MSP10 manufactured by Mitsubishi Heavy Industries, Ltd.) at a barrel temperature of 240° C. to prepare an injection molded material (127 mm×12.7 mm×6.4 mm). Two ends of the injection molded material were cut to prepare a 63.5 mm×12.7 mm×6.4 mm test piece. The test piece was worked with a notching machine to prepare a sample. The Izod impact strength was tested according to ASTM D-256 at 23° C.

(d) Evaluation of Transparency

The pellets prepared according to the conditions set forth in EXAMPLE 1 were injection-molded with an injection molding machine (160MSP10 manufactured by Mitsubishi Heavy Industries, Ltd.) at a barrel temperature of 240° C. to prepare a flat board (150 mm×100 mm×3 mm) for determining the transparency. The haze value of the obtained flat board was measured with a hazemeter (Σ80, manufactured by Nippon Denshoku Industries Co., Ltd.) according to Japanese Industrial Standards (JIS) K 6714.

Example 1

(1) Polymerization of Butadiene-Styrene Rubber Latex

Two hundred parts by weight of water and 0.2 part by weight of potassium persulfate were charged in a 100-L pressure-resistant polymerization apparatus and stirred. Appropriate nitrogen substitution was conducted to remove oxygen. Subsequently, 1 part by weight of sodium oleate, 2 parts by weight of sodium rosinate, 75 parts by weight of butadiene, and 25 parts by weight of styrene were injected into the system and the resulting mixture was heated to 60° C. to initiate polymerization. The polymerization lasted for 12 hours. The rate of polymerization conversion was 96%, and the volume-average particle diameter of the rubber latex was 860 Å.

(2) Polymerization of Acid-Group-Group-Containing Copolymer Latex

Two hundred parts by weight of water and 0.5 part by weight of sodium dioctyl sulfosuccinate were charged in a 8-L polymerization apparatus and were heated to 70° C. with stirring in a nitrogen flow. A mixture containing 0.3 part by weight of sodium formaldehyde sulfoxylate, 0.0025 part by weight of ferrous sulfate, and 0.01 part by weight of ethylenediaminetetraacetic acid was added. Several minutes later, a mixture containing 3 parts by weight of butyl methacrylate, 9 parts by weight of butyl acrylate, 12 parts by weight of styrene, 0.125 part by weight of t-dodecyl mercaptan, and 0.025 part by weight of cumene hydroperoxide was continuously added dropwise at a rate of 20 parts by weight per hour using a metering pump. Subsequently, a mixture containing 7 parts by weight of butyl methacrylate, 20 parts by weight of butyl acrylate, 34 parts by weight of styrene, 15 parts by weight of methacrylic acid, 0.3 part by weight of t-dodecyl mercaptan, and 0.08 part by weight of cumene hydroperoxide was added dropwise at a rate of 20 parts by weight per hour. The polymerization was terminated 1.5 hours after the completion of the dropping. The rate of polymerization conversion was 99.7%, the volume-average particle diameter was 1,020 Å, the density was 33%, the pH was 2.8, and the refractive index was 1.532.

(3) Preparation of Agglomerated Butadiene-Styrene Rubber

One hundred percent by weight (in terms of solid component) of the butadiene-styrene rubber latex obtained in (1) and 20 percent by weight of water were charged in an 8-L polymerization apparatus, and were heated to 60° C. with stirring in a nitrogen flow. To the mixture was added dropwise 0.1 part by weight of sodium hydroxide, 2.0 parts by weight (in terms of solid component) of the acid-group-group-containing copolymer latex obtained in (2), and the stirring was continued for one hour to agglomerate the butadiene-styrene rubber. Two hundred parts by weight of water and 0.4 part by weight of sodium dodecylbenzenesulfonate were added, and the resulting mixture was stirred for thirty minutes to complete agglomeration. An agglomerated butadiene-styrene rubber latex having a volume-average particle diameter of 5,500 Å was obtained as a result.

(4) Copolymerization of Agglomerated Butadiene-Styrene Rubber

Seventy parts by weight (in terms of solid content) of the agglomerated butadiene-styrene rubber latex obtained in (3) was charged in an 8-L polymerization apparatus and was heated with stirring to 60° C. in a nitrogen flow. To the resulting mixture was added 0.18 part by weight of sodium formaldehyde sulfoxylate, 0.001 part by weight of ferrous sulfate, and 0.004 part by weight of ethylenediaminetetraacetic acid. Subsequently, a mixture, which contains 0.2 part by weight of t-butylhydroperoxide and 30 parts by weight of a monomer mixture containing 12.7 parts by weight of methyl methacrylate, 3.8 parts by weight of butyl methacrylate, and 13.5 parts by weight of styrene, was continuously fed dropwise into the polymerization apparatus at a rate of 10 parts by weight per hour using a metering pump. During the process of adding the monomer mixture, 0.2 part by weight of sodium dioctyl sulfosuccinate was added into the contents of the polymerization apparatus every hour for a total of three times. Upon completion of the addition of the monomer mixture, stirring was further continued for an hour to complete the polymerization. The rate of polymerization conversion was 96%, and the volume-average particle diameter of the latex was 6,400 Å.

In the latex was added 0.5 part by weight of dilauryl 3,3'-thiodipropionate (DLTP) and 0.5 part by weight of 2,6-di-t-butyl-4-methylphenol (BHT). Five parts by weight of calcium chloride was added to conduct precipitation. The resulting mixture was heated to 90° C. and dehydrated to obtain a dry powder. The refractive index was 1.534.

(5) Polymerization of Acryl-Aromatic Vinyl Resin

An acryl-aromatic vinyl resin composed of methyl methacrylate and styrene was prepared by suspension polymerization as follows. Two hundred parts by weight of water, 0.02 part by weight of sodium dodecylbenzenesulfonate, and 1 part by weight of calcium phosphate were charged into a 100-L polymerization apparatus. After removal of oxygen by proper nitrogen substitution with stirring, the mixture was heated to 60° C., and 55 parts by weight of methyl methacrylate, 45 parts by weight of styrene, and 0.8 part by weight of benzoyl peroxide were added into the mixture at the same time. The resulting mixture was stirred for five hours to terminate the reaction. The mixture was dehydrated to obtain a dry acryl-aromatic vinyl resin. The refraction index was 1.535.

(6) Preparation of Impact-Resistant Thermoplastic Resin Composition

Seventy five parts by weight of the acryl-aromatic vinyl resin prepared in (5), 25 parts by weight of the graft copolymer obtained in (4), and 0.1 part by weight of a hindered phenol stabilizer were mixed, and the resulting mixture was melted and kneaded with a single-screw extruder (HW-40-28, manufactured by Tabata Industrial Machinery Co., Ltd.) and worked into pellets of the impact-resistant acryl-aromatic vinyl resin composition.

The impact resistance and the transparency of the extrusion-molded products made from the pellets were examined. The results are shown in Table 1.

Example 2

The resin composition was prepared as in EXAMPLE 1 except that the amount of the acid-group-group-containing copolymer latex used in making the large butadiene-styrene rubber was changed from 2.0 parts by weight to 3.5 parts by weight (in terms of solid content). The volume-average particle diameter of the obtained agglomerated rubber latex was 3,000 Å. The volume-average particle diameter of the graft copolymer latex was 3,500 Å. The results of property examination are shown in Table 1 in the column of EXAMPLE 2.

Example 3

(1) Preparation of Styrene-Acrylonitrile Copolymer

A copolymer resin composed of styrene and acrylonitrile was prepared by suspension polymerization as follows. Two hundred parts by weight of water, 0.02 part by weight of dodecylbenzenesulfonate, and 1 part by weight of calcium phosphate were charged in an 8-L polymerization apparatus.

After removal of oxygen by proper nitrogen substitution with stirring, the mixture was heated to 85° C. In the mixture was added 75 parts by weight of styrene, 25 parts by weight of acrylonitrile, and 0.8 part by weight of benzoyl peroxide at the same time, and the resulting mixture was stirred for five hours. To the resulting mixture was further added 0.8 part by weight of benzoyl peroxide, and the resulting mixture was stirred for five hours to terminate the reaction. A styrene-acrylonitrile copolymer resin was obtained by dehydration. The refraction index was 1.57.

(2) Preparation of Methyl Methacrylate Polymer

A methyl methacrylate polymer resin was prepared by suspension polymerization as follows. Two hundred fifty parts by weight of water, 0.02 part by weight of sodium dodecylbenzenesulfonate, and 1 part by weight of calcium phosphate was charged in an 8-L polymerization apparatus. After removal of oxygen by proper nitrogen substitution with stirring, the mixture was heated to 60° C.; subsequently, 96 parts by weight of methyl methacrylate, 4 parts by weight of methyl acrylate, 0.1 part by weight of n-dodecyl mercaptan, and 0.3 part by weight of benzoyl peroxide were added to the mixture at the same time. The resulting mixture was stirred for five hours to complete the reaction. A methyl methacrylate polymer resin was obtained by dehydration. The refractive index was 1.489.

(3) Preparation of Impact-Resistant Thermoplastic Resin Composition

A resin composition was prepared as in EXAMPLE 1 except that the matrix copolymer was replaced by 39.7 parts by weight of the styrene-acrylonitrile copolymer resin obtained in (1) and 35.3 parts by weight of the methyl methacrylate copolymer resin obtained in (2) (the refractive index of the matrix as a whole was 1.532). The results of property examination are shown in Table 1 in the column of EXAMPLE 3.

Comparative Example 1

(1) Polymerization of Acid-Group-Group-Containing Copolymer Latex

Two hundred parts by weight of water and 0.5 part by weight of sodium dioctyl sulfosuccinate were charged in an 8-L polymerization apparatus. After removal of oxygen by proper nitrogen substitution with stirring, the mixture was heated to 70° C. To the resulting mixture was added 0.3 part by weight of sodium formaldehyde sulfoxylate, 0.0025 part by weight of ferrous sulfate, and 0.01 part by weight of ethylenediaminetetraacetic acid. After several minutes, a mixture containing 2 parts by weight of butyl methacrylate, 23 parts by weight of butyl acrylate, 2 parts of methacrylic acid, 0.125 part by weight of t-dodecyl mercaptan, and 0.025 part by weight of cumene hydroperoxide were continuously added dropwise at a rate of 20 parts by weight per hour using a metering pump. Subsequently, a mixture containing 58 parts by weight of butyl methacrylate, 2 parts by weight of butyl acrylate, 13 parts by weight of methacrylic acid, 0.3 part by weight of t-dodecyl mercaptan and 0.08 part by weight of cumene hydroperoxide were added dropwise at a rate of 20 parts by weight per hour. The polymerization was terminated 1.5 hours after completion of the dropping. The rate of conversion was 99.7%, the volume-average particle diameter was 1,050 Å, the density was 33%, and the pH was 2.8. Five parts by weight of calcium chloride was added to a moiety of the latex to conduct precipitation. The resulting mixture was heated to 50° C. and dehydrated to obtain a dry powder having a refractive index of 1.482.

(2) Preparation of Graft Copolymer and Preparation and Property Evaluation of Thermoplastic Resin Composition A resin composition was prepared as in EXAMPLE 1 but with the acid-group-group-containing copolymer latex obtained in (1) above. The volume-average particle diameter of the obtained graft copolymer was 6,600 Å, and the refractive index was 1.532. The results of the property evaluation are shown in Table 1 in the column of COMPARATIVE EXAMPLE 1.

Comparative Example 2

(1) Polymerization of Acid-Group-Group-Containing Copolymer Latex

A resin composition was prepared as in EXAMPLE 1 except that during the polymerization of the acid-group-group-containing copolymer latex, the amount of the sodium dioctyl sulfosuccinate used was changed from 0.5 part by weight to 3.0 parts by weight. The rate of polymerization conversion of the resulting acid-group-group-containing copolymer latex was 99.7%, the volume-average particle diameter was 490 Å, the density was 33%, the pH was 2.8, and the refractive index was 1.532. The average particle diameter of the agglomerated rubber was 1,730 Å, the average particle diameter of the graft copolymer was 1,880 Å, and the refractive index was 1.534. The results of the property evaluation are shown in Table 1 in the column of COMPARATIVE EXAMPLE 2.

Comparative Example 3

A resin composition was prepared as in EXAMPLE 1 except that the acid-group-group-containing copolymer latex was not added, and unagglomerated butadiene-styrene rubber was used to prepare a graft copolymer. The rate of polymerization conversion of the graft copolymer was 96%, the volume-average particle diameter of the latex was 1,800 Å, and the refractive index was 1.534. The results of the property evaluation are shown in Table 1 in the column of COMPARATIVE EXAMPLE 3.

TABLE 1

| | Rubber | Acid-group-group-containing copolymer latex | | | | | Thick rubber | | Graft copolymer | | | | | |
| --- | --- | --- | --- | --- | --- | --- | --- | --- | --- | --- | --- | --- | --- | --- |
| | Composition of rubber | Composition of acid-group-group-containing copolymer | | | | Refractive index | Parts added | Particle size | Parts | Composition of graft | | | Parts | Particle size | Refractive index |
| EXAMPLE | Bd/St | BA | BMA | St | MAA | nD | phr | Å | phr | MMA | BMA | St | phr | Å | nD |
| EX. 1 | 75/25 | 29 | 10 | 46 | 15 | 1.532 | 2.0 | 5500 | 70 | 12.7 | 3.8 | 13.5 | 30 | 6400 | 1.534 |
| EX. 2 | 75/25 | 29 | 10 | 46 | 15 | 1.532 | 3.5 | 3000 | 70 | 12.7 | 3.8 | 13.5 | 30 | 3500 | 1.534 |
| EX. 3 | 75/25 | 29 | 10 | 46 | 15 | 1.532 | 2.0 | 5500 | 70 | 12.7 | 3.8 | 13.5 | 30 | 6400 | 1.534 |
| CE. 1 | 75/25 | 25 | 60 | 0 | 15 | 1.482 | 2.0 | 5700 | 70 | 12.7 | 3.8 | 13.5 | 30 | 6600 | 1.532 |
| CE. 2 | 75/25 | 29 | 10 | 46 | 15 | 1.532 | 2.0 | 1730 | 70 | 12.7 | 3.8 | 13.5 | 30 | 1880 | 1.534 |
| CE. 3 | 75/25 | — | — | — | — | — | 0.0 | 860 | 70 | 12.7 | 3.8 | 13.5 | 30 | 1800 | 1.534 |

TABLE 1-continued

| | Graft copolymer | Matrix copolymer (1) | | | | Matrix copolymer (2) | | | Property evaluation | |
|---|---|---|---|---|---|---|---|---|---|---|
| | Parts | Composition | | | Parts | Composition | | Parts | Izod | Haze |
| | phr | MMA | St | BA | phr | St | AN | phr | kg · cm/cm$^2$ | % |
| EX. 1 | 25 | 55 | 45 | 0 | 75 | | | | 12.1 | 2.7 |
| EX. 2 | 25 | 55 | 45 | 0 | 75 | | | | 10.2 | 2.1 |
| EX. 3 | 25 | 96 | 0 | 4 | 35.3 | 75 | 25 | 39.7 | 10.8 | 2.5 |
| CE. 1 | 25 | 55 | 45 | 0 | 75 | | | | 12.3 | 8.6 |
| CE. 2 | 25 | 55 | 45 | 0 | 75 | | | | 3.9 | 1.7 |
| CE. 3 | 25 | 55 | 45 | 0 | 75 | | | | 3.2 | 1.9 |

*EX. denotes EXAMPLE and
CE. denotes COMPARATIVE EXAMPLE

As the data in Table 1 clearly show, resin compositions embodying features of the present invention have high impact resistance and superior transparency.

The impact-resistant thermoplastic resin compositions embodying features of the present invention may be melted, kneaded, and formed into various molded products by extrusion molding or injection molding. The present invention is suitably applied to mold materials that require high strength and superior transparency. For example, the invention is suitably applied to covers of lighting, transparent containers, and medical supplies.

The foregoing detailed description and Examples have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. An impact-resistant thermoplastic resin composition comprising:
   5 to 40 parts by weight of a graft copolymer (A) and 95 to 60 parts by weight of a copolymer (B);
      wherein the copolymer (B) is prepared by polymerizing 75 to 100 percent by weight of a monomer selected from the group consisting of an aromatic vinyl monomer, an alkyl methacrylate monomer, a vinylcyanide monomer, and combinations thereof with 25 to 0 percent by weight of a vinyl monomer copolymerizable therewith, wherein the aromatic vinyl monomer comprises 20 to 90 percent by weight, such that (A) and (B) total 100 parts by weight; and
      wherein the graft copolymer (A) is prepared by polymerizing 60 to 15 parts by weight of a monomer mixture (GM) in the presence of 40 to 85 parts by weight of agglomerated rubber particles (R2) having a volume average particle diameter of 1,900 to 20,000 Å, such that the agglomerated rubber particles (R2) and the monomer mixture (GM) total 100 parts by weight;
      wherein the monomer mixture (GM) comprises 80 to 100 percent by weight of a monomer selected from the group consisting of an alkyl methacrylate monomer, an aromatic vinyl monomer, a vinylcyanide monomer, and combinations thereof, and 20 to 0 percent by weight of a vinyl monomer copolymerizable therewith;
      wherein the agglomerated rubber particles (R2) are prepared through cohesion by adding 0.5 to 6 parts by solid content weight of an acid-group-containing copolymer (S) latex into 100 parts by weight of a diene rubber (R1) having a volume average particle diameter of 1,500 Å or less;
      wherein the acid-group-containing copolymer (S) latex is prepared by polymerizing a monomer mixture comprising 10 to 20 percent by weight of an unsaturated acid monomer selected from the group consisting of acrylic acid, methacrylic acid, itaconic acid, crotonic acid, and combinations thereof, 30 to 60 percent by weight of an aromatic vinyl monomer, 15 to 30 percent by weight of one or a plurality of alkyl acrylate monomers comprising a $C_1$ to $C_{12}$ alkyl, 0 to 15 percent by weight of an alkyl methacrylate monomer comprising a $C_1$ to $C_{12}$ alkyl, and 0 to 20 percent by weight of a vinyl monomer copolymerizable therewith; and
      wherein the diene rubber (R1) is prepared by polymerizing a monomer mixture comprising 60 to 95 percent by weight of a conjugated diene monomer, 40 to 5 percent by weight of an aromatic vinyl monomer, 10 to 0 percent by weight of a vinyl monomer copolymerizable with the conjugated diene monomer, 0 to 3 percent by weight of a cross-linkable monomer, and 0 to 3 percent by weight of a chain transfer agent; and
      wherein a difference in refractive index between the acid-group-containing copolymer (S) and the graft copolymer (A) is 0.02 or less.

2. The invention of claim 1, wherein a difference in a refractive index between the graft copolymer (A) and the copolymer (B) is 0.02 or less.

3. The invention of claim 1, wherein the acid-group-containing polymer latex (S) comprises an acid-group-containing polymer having a multilayer structure prepared by:
   polymerizing a monomer mixture (s1) comprising (a) lower unsaturated acid content compared to an average unsaturated acid content of the acid-group-containing polymer latex (S) or (b) no unsaturated acid; and
   sequentially polymerizing a monomer mixture (s2) comprising a higher unsaturated acid content compared to the average unsaturated acid content of the acid-group-containing polymer latex (S) thereby forming an outer layer.

4. The invention of claim 1, wherein the copolymer (B) comprises a mixture comprising at least two polymers or copolymers, wherein the mixture comprises 20 to 90 percent by weight of the aromatic vinyl monomer, 10 to 80 percent by weight of a monomer selected from the group consisting of a vinylcyanide monomer, an alkyl methacrylate monomer, and a combination thereof, and 0 to 25 percent by weight of the vinyl monomer copolymerizable therewith.

* * * * *